United States Patent
Wood

[15] 3,700,925
[45] Oct. 24, 1972

[54] THYRISTOR TAP CHANGER FOR ELECTRICAL INDUCTIVE APPARATUS

[72] Inventor: Peter Wood, Murrysville, Pa.

[73] Assignee: Westinghouse Electric Corporation, Pittsburgh, Pa.

[22] Filed: March 29, 1971

[21] Appl. No.: 128,728

[52] U.S. Cl.............307/252 Q, 323/43.5 S, 323/45
[51] Int. Cl......................H03k 17/00, H03k 17/56
[58] Field of Search.......307/254, 255, 252 Q, 252 P; 323/43.55, 45

[56] References Cited

UNITED STATES PATENTS 3,195,038    7/1965    Fry.......................323/43.5 S

Primary Examiner—John Zazworsky
Attorney—A. T. Stratton and F. E. Browder

[57] ABSTRACT

Tap changing arrangements comprising winding sections which are bridged by gate controlled switches which interconnect each winding section to aid, oppose or bypass other winding sections. The tap changing arrangements and switching sequences permit lower switch ratings without sacrificing performance.

2 Claims, 6 Drawing Figures

PATENTED OCT 24 1972 3,700,925

WITNESSES:
Bernard R. Gieguey
John R. Hanway

INVENTOR
Peter Wood

BY
F. E. Browder
ATTORNEY

|  | ARRANGEMENT OF FIG. 1 | | | | ARRANGEMENT OF FIG. 2 | | | ARRANGEMENT OF FIG. 3 | | | |
|---|---|---|---|---|---|---|---|---|---|---|---|
| NUMBER OF SECTIONS | 1 | 2 | 3 | 4 | 2 | 3 | 4 | 1 | 2 | 3 | 4 |
| VOLTAGE PER SECTION | $\frac{V}{2}$ | $\frac{V}{4}$ | $\frac{V}{6}$ | $\frac{V}{8}$ | $\frac{V}{4}$ | $\frac{V}{6}$ | $\frac{V}{8}$ | $V$ | $\frac{V}{2}$ | $\frac{V}{3}$ | $\frac{V}{4}$ |
| VOLTAGE RANGE | $V$ | $V$ | $V$ | $V$ | $V$ | $V$ | $V$ | $V$ | $V$ | $V$ | $V$ |
| VOLTAGE INCREMENT WITHOUT SUB-CYCLE SWITCHING | $\frac{V}{2}$ | $\frac{V}{4}$ | $\frac{V}{6}$ | $\frac{V}{8}$ | $\frac{V}{4}$ | $\frac{V}{6}$ | $\frac{V}{8}$ | $V$ | $\frac{V}{2}$ | $\frac{V}{3}$ | $\frac{V}{4}$ |
| MAXIMUM INDIVIDUAL SWITCH RATING | $\frac{V}{2}$ | $\frac{V}{4}$ | $\frac{V}{6}$ | $\frac{V}{8}$ | $\frac{V}{2}$ | $\frac{V}{2}$ | $\frac{V}{2}$ | $V$ | $V$ | $V$ | $V$ |
| TOTAL SWITCH RATING | $2V$ | $2V$ | $2V$ | $2V$ | $2\frac{1}{4}V$ | $2\frac{2}{3}V$ | $3V$ | $2V$ | $2\frac{1}{2}V$ | $3\frac{1}{3}V$ | $4V$ |

FIG. 4

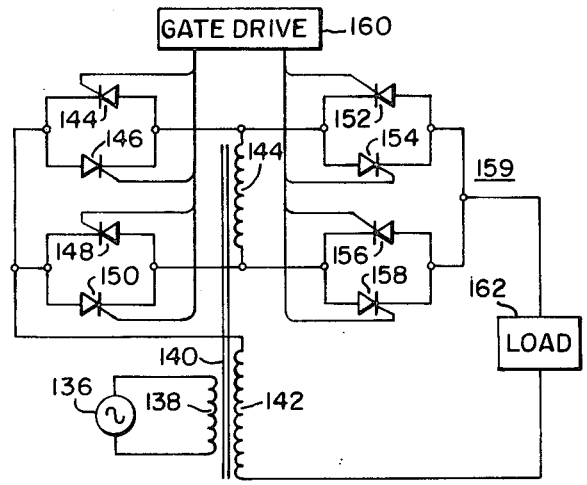

FIG. 5

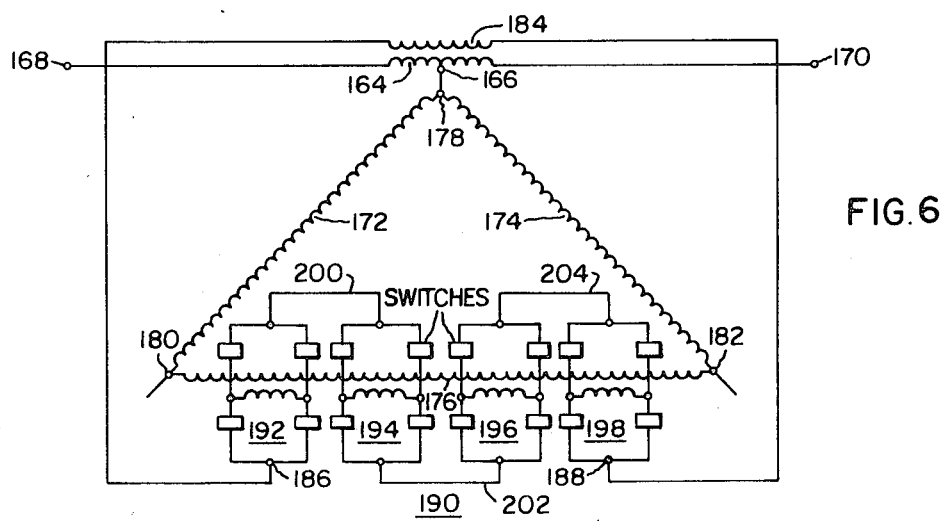

FIG. 6

THYRISTOR TAP CHANGER FOR ELECTRICAL INDUCTIVE APPARATUS

BACKGROUND OF THE INVENTION

1. Field of the Invention

This invention relates in general to electrical control apparatus, and more particularly to the method of changing taps on electrical inductive apparatus.

2. Description of the Prior Art:

Tap changing is used extensively in various types of electrical inductive apparatus. AC voltage regulators usually have a tapped secondary winding which may be connected to a load through any of the taps. HVDC rectifiers often have tapped windings to provide increased control of the rectified voltage. Numerous phase angle regulators use tapped windings to affect a change in the phase angle of the system. Most of the tap changing methods require a switching means to provide the tap change. The majority of the apparatus operating at high potentials utilize mechanical contact switches of various types instead of "electronic" gate controlled switches. This is necessary because of the economic and technical disadvantages of using "electronic" switches at high potential and current levels. The required reaction time of the mechanical tap changing method imposes an important disadvantage on this type of method. The delayed reaction time inherent in the mechanical method can be disasterous when used in conjunction with heavily loaded high potential power distribution systems.

The performance of a tap changing arrangement is a function of several variables. Two important variables are the total tap range and the tapping increment. For tap changing voltage regulators, this would be the total variation of voltage and the smallest voltage increment which could be controlled. When the regulator voltage is continuously variable, by use of subcycle switching techniques, the harmonic content of the output wave is also an important performance factor. Methods herebefore used for "electronic" switching of winding taps have suffered from the fact that improving the performance of the tap changing arrangement drastically increases the switch rating required.

Generally, the performance is improved by increasing the number of tap positions available for selection. As a result thereof, the volt-ampere ratings for the switches involved are increased, and "electronic" switches are not economically as attractive as mechanical switches at the present. Therefore, it is desirable to provide a method of changing the taps on electrical inductive apparatus quickly and economically while providing satisfactory performance.

SUMMARY OF THE INVENTION

The quick response time of the "electronic" switch makes it desirable for use with high power tap changing apparatus. However, the problems associated with producing "electronic" switches capable of safely handling the high potentials and currents involved have restricted the use of "electronic" switches in high power applications. This invention discloses a method of arranging switches which, if the response time is sufficiently fast and the gating sequence is properly arranged, will permit the economical use of "electronic" switching elements.

One embodiment of the invention teaches a tap changing method which bridges the tap winding with four "electronic" switching elements. By properly sequencing the gate signal which drives the switches, a conduction pattern can be established which will cause the tapped winding to be placed into a circuit so that it will aid, oppose or bypass the circuit. The basic arrangement can be extended to a multiple section arrangement by the addition of separate winding and switch sections or by the addition of additional switches between the bridge and the tapped winding. Both methods permit lowering of the switch ratings.

The total switch rating, that is, the sum of the individual switch ratings for the arrangement, is perhaps the most important factor in determining the economic feasibility of the arrangement. The individual switch rating is also important, but the number of independent switching positions does not significantly affect the economics of the arrangement. Lowering the individual ratings while keeping the total ratings constant may be advantageous since it is generally true that an "electronic" switch having twice the rating of another costs more than twice the other. Where the rating requirements are such that the switches must be series and/or parallel connected at the individual switching positions, the total switch rating for the arrangement is a true criteria for determining the economic feasibility of the switches involved in the arrangement. The total switch rating is simply the sum of the ratings for all the switches used irregardless of the number of switching positions.

It is, therefore, an object of this invention to provide a new and improved method for arranging the "electronic" switches used in tap changing electrical inductive apparatus.

BRIEF DESCRIPTION OF THE DRAWING

Further advantages and uses of this invention will become more apparent when considered in view of the following detailed description and drawing, in which:

FIG. 4 is a table relating various quantities of the circuits of FIGS. 1, 2 and 3;

FIG. 5 is a schematic diagram of an AC tap changing voltage regulator constructed according to the teachings of this invention; and FIG. 6 is a schematic diagram illustrating one phase of a three-phase phase angle regulator constructed according to the teachings of this invention.

DESCRIPTION OF THE PREFERRED EMBODIMENT

Figure 1:
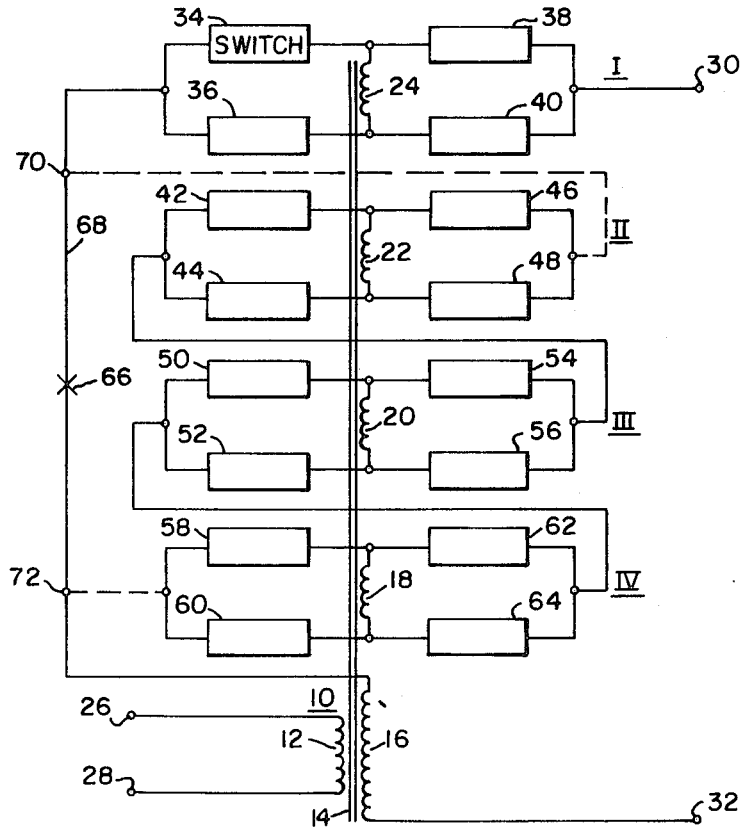
FIG. 1 is a schematic diagram illustrating an arrangement for tap changing taught by one embodiment of this invention.

Throughout the following description, similar reference characters refer to similar elements in all Figures of the drawing.

Referring now to the drawing, and FIG. 1 in particular, there is shown a schematic circuit diagram illustrating an embodiment of this invention. The transformer 10 comprises a primary winding 12, a magnetic core 14 and secondary windings 16, 18, 20, 22 and 24. The primary winding 12 has terminals 26 and 28 suitable for applying a source of AC voltage. A current flowing in the primary winding induces a voltage in the secondary windings which appear between the secondary terminals 30 and 32. The magnitude of the voltage between the terminals 30 and 32 is dependent upon the method of connecting the output voltage of the winding 16 to the other secondary windings. The winding 24 is bridged by switching elements 34, 36, 38 and 40. One end of the bridge is connected to the output terminal 30 and the other end of the bridge is connected to the secondary winding 16. The arrangement of the winding 24 and the bridge comprising the switches 34, 36, 38 and 40 will be referred to as section I. Three other similar sections, denoted II, III and IV, are shown in FIG. 1. These three sections are connected to the terminals 70 and 72 when they are being used in the circuit. Section II comprises the winding 22 and the switches 42, 44, 46 and 48; section III comprises the winding 20 and the switches 50, 52, 54 and 56; and section IV comprises the winding 18 and the switches 58, 60, 62 and 64. A mark 66 indicates that the direct connection 68, between the terminals 70 and 72, is removed when the tap changing arrangement includes sections I, II, III and IV. The tap changing arrangement will first be discussed on the basis that only section I is being used. Later discussion will include sections II, III and IV.

The switching elements of section I each comprise electronic gate controlled devices which are capable of being switched in a relatively short period of time, such as 10 to 100 microseconds. Solid state semiconductor four-layer devices are particularly suitable for the switching elements. Thyristors, such as silicon controlled rectifiers or gate controlled switches, may be connected in inverse parallel to provide adequate switching characteristics. The switches are controlled by a gate control means, not shown in FIG. 1, which provides the proper switching sequence to give the desired results.

The switching sequence produces three basic switching patterns. The induced voltage developed across the winding 24 may be connected to the induced voltage developed across the winding 16 in such a manner as to produce either a sum or difference voltage at the terminals 30 and 32. The voltage on the winding 24 may also be bypassed, thus providing the voltage on winding 16 across the terminals 30 and 32. In the aiding pattern, the switches 36 and 38 are conducting and the switches 34 and 40 are not conducting. In the opposing pattern, the switches 34 and 40 are conducting and the switches 36 and 38 are not conducting. When the winding 24 is bypassed, either the switches 34 and 38 are conducting and 36 and 40 are not conducting, or 36 and 40 are conducting and 34 and 38 are not conducting. By utilizing these switching patterns, the voltage appearing across the terminals 30 and 32 may be controlled within a range of two times the voltage across the winding 24 and in voltage increments equal to the voltage across the winding 24. Assuming that a voltage V exists across the winding 24 and that a voltage X exists across the winding 16, the output voltage at the terminals 30 and 32, disregarding conductor losses, may be X, X + V or X − V, depending on the switching pattern.

The addition of other sections provides further voltage control possibilities. Any number of sections may be incorporated into the tap changing arrangement depending upon the performance requirements. FIG. 1 illustrates how three additional sections may be connected to achieve the desired control. The connection 68, between the terminals 70 and 72, is broken when the arrangement of FIG. 1 is operated with all four sections.

Increasing the number of sections may increase the voltage range which may be selected by the tap changing arrangement, or decrease the voltage increments by which the output voltage can be varied, or a combination of both. Assuming that a voltage X is developed across the winding 16 and that a total voltage V is developed across the four sections I, II, III and IV, the voltage at the terminals 30 and 32 may be varied between X + V and X − V in voltage increments equal to V/4.

Figure 2:
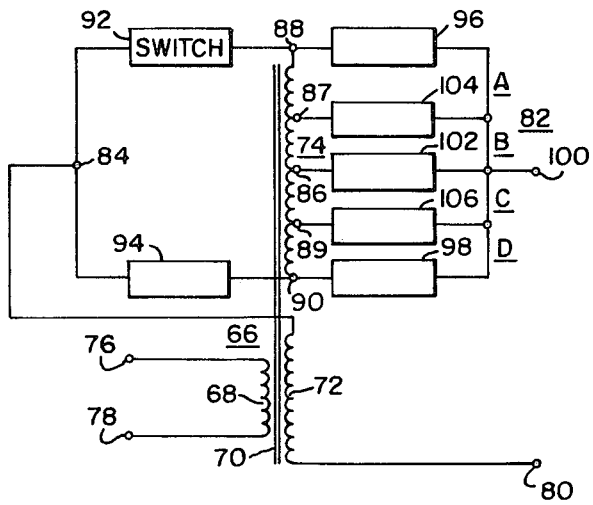
FIG. 2 is a schematic diagram illustrating an arrangement for tap changing taught by another embodiment of this invention.

Another embodiment of this invention is illustrated in FIG. 2. This embodiment is of particular advantage when it is not practical to use a transformer having a plurality of individual windings. The transformer 66 comprises a primary winding 68, a magnetic core 70, and secondary windings 72 and 74. The primary winding 68 has terminals 76 and 78 suitable for applying a source of AC voltage. The secondary winding 72 is connected to an output terminal 80 and a bridge section 82 at a terminal 84. The winding 74 includes end terminals 88 and 90 and at least one intermediate tap terminal, shown in FIG. 1 as a center tap terminal 86. The taps 87 and 89 are pertinent to a subsequent discussion concerning variations in the basic circuit of FIG. 2. Switching elements 92, 94, 96 and 98 are bridged, as shown, across the winding 74 and between the terminals 84 and the output terminal 100. Each switching element comprises electronic gate controlled devices similar to those described concerning FIG. 1. A similar switching element 102 is connected between the output terminal 100 and the center tap terminal 86. The switching elements 104 and 106 are not involved in the immediate discussion.

There are five basic and usable patterns available to connect the terminal 84 to the terminal 100. A first pattern has the bridge switches 92 and 96 closed, 94 and 98 open, and the center tap switch 102 open. This effectively bypasses the winding 74. A second pattern has the switches 92 and 98 closed, and 94, 96 and 102 open. This pattern causes the full voltage of the winding 74 to oppose that of the winding 72. A third pattern has the switches 92, 98 and 102 open and 94 and 96 closed. This pattern caused the full voltage of the winding 74 to aid that of the winding 72. A fourth pattern has the switches 92 and 102 closed and 94, 96 and 98 open causing one half of the voltage of the winding 74 to oppose that of the winding 72. A fifth pattern has the switches 94 and 102 closed and 92, 96 and 98 open causing one half of the voltage of the winding 74 to aid that of the winding 72. Thus, with the two section arrangement shown in FIG. 2 by removing the switches 104 and 106, the voltage at the output terminals 80 and 100 may be controlled within a range of two times the voltage across the winding 74 with a voltage increment equal to one half of the voltage across the winding 74. If a voltage X exists across the terminals 80 and 84 of the winding 72, and a voltage V exists across the winding 74, the output voltage at the terminals 80 and 100, disregarding conductor losses, may be X, X + V/2, X − V/2, X + V or X − V, depending on the switching pattern.

Additional switches may be connected between the output terminal 100 and the winding 74 to provide voltage control in smaller increments. To obtain equal voltage increments throughout the control range, each intermediate switch should be connected to a tap on the winding 74 which provides equal section voltages. That is, if a three section arrangement is desired, there would be two intermediate switches. One would be connected to a tap positioned to select ⅓ of the full winding voltage and the other would be positioned to select ⅔ of the full winding voltage. A center tap switch is not used in a three section arrangement having equal voltage increments. A four section arrangement is shown in FIG. 2 by using the complete circuit illustrated. The winding tap 89 effectively center taps the winding section between the terminals 86 and 90 and, similarly, the tap 87 center taps the winding between the terminals 86 and 88. The four sections are represented by letters A, B, C and D. With this arrangement, the voltage across the output terminals 80 and 100 can be varied over a range equal to plus or minus the full voltage across the winding 74 in voltage increments equal to ¼ of the full voltage.

The switching arrangements of FIGS. 1 and 2 have been discussed relative to switching sequences which permit the switch to conduct during the entire cycle. The effect of such a sequence is that only incremental control is possible. By the use of subcycle switching techniques it is possible to vary the output voltage continuously. In subcycle switching the sequence is such that conduction occurs only during part of the half cycle. This causes less than the full section voltage to aid or oppose as determined by the switching pattern. The greater the voltage of the section being subcycle switched, the greater the harmonic content of the total output voltage. Therefore, this invention is also particularly useful for subcycle tap changing techniques since a low section voltage is readily obtainable.

The utility of this invention is not restricted to its ability to provide means for sectioning windings for tap changing purposes. Various arrangements in the prior art have suggested sectioning of a winding and tapping the sections through electronic gate controlled switches. This invention teaches arrangements, herebefore unknown, which when properly sequenced reduce the required individual switch volt-ampere rating and the total switch rating of the arrangement compared to previously existing methods. This can be illustrated by a comparison of the tap changing arrangements shown in FIGS. 1 and 2 with a prior art method shown in FIG. 3.

Figure 3:
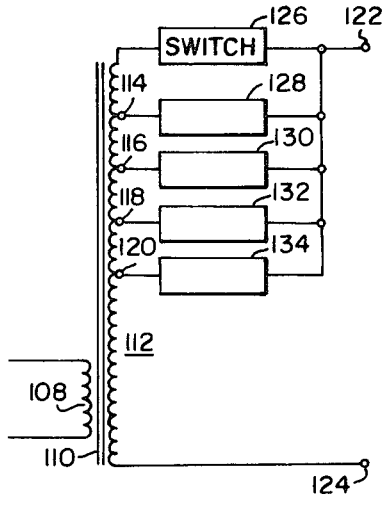
FIG. 3 is a schematic diagram illustrating a tap changing arrangement known in the prior art.

The tap changing arrangement of FIG. 3 includes a primary winding 108, a magnetic core 110, a secondary winding 112 having intermediate tap terminals 114, 116, 118 and 120. The output of the secondary winding 112 is developed across the terminals 122 and 124. The most basic arrangement would include switches 126 and 128 connected as shown to provide a one section tap changing arrangement. Additional switches such as 130, 132 and 134 can be added for greater control. The two section arrangement comprising switches 126, 128 and 130 as shown in FIG. 3 provides the same control range and increment value as the basic one section arrangement shown in FIG. 1.

FIG. 4 is a table depicting pertinent voltages and switch ratings of the various tap changing arrangements. The quantities have been tabulated on the basis that each arrangement is to provide the same overall voltage range V. The maximum individual switch rating is a function of the maximum voltage which may be placed across the switch and the maximum current flowing through the switch. Since in incremental or subcycle operation any of the switches may carry the full load current, the relative volt-ampere rating is accurately shown by the maximum voltage applied to the switch. It is necessary, in tap changers operating under load, that a conduction path be maintained while changing taps. Otherwise, the full secondary output voltage will be applied across the tap breaking switch and it must be rated accordingly. Conventional under load tap changers, including the tap changing arrangement of FIG. 3, operate in this manner. Therefore, the maximum voltage applied to the switch is determined by the voltage between the tap section.

The following example indicates how the determination of the switch ratings of FIG. 4 are established. Considering the complete four section arrangement shown in FIG. 1, the voltage range desired is equal to V, or plus or minus V/2. With V/2 across all four sections, a voltage equal to V/8 exists across each individual section. Since a single section can be switched, the smallest increment of change without subcycle switching is equal to V/8. The maximum voltage to which any of the four switches in the bridge will be exposed to is V/8. Therefore, the total switch rating for one section is four times V/8, or V/2. All four sections have the same ratings, therefore, the total switch rating for the four section arrangement is 2V.

Considering the complete four section arrangement shown in FIG. 2, the voltage range is also V, or plus or minus V/2. The voltage across all four sections is V/2 and the voltage per section is V/8. The switches 92, 94, 96 and 98 must be rated to handle the full voltage V/2. The switch 102 must be rated one half of the full four-section voltage, or V/4. A voltage equal to ¾ of the full four-section voltage, V/2, may be applied to the switches 104 and 106, therefore, they must be rated ¾ times V/2, or ⅜V. The sum of the individual ratings represents the total switch voltage rating for the four section arrangement of FIG. 2 and is equal to 3V.

Considering the complete four section arrangement shown in FIG. 3, the voltage range is also V, or plus or minus V/2. The total voltage across the four sections is equal to V. The switches 126 and 134 must be able to handle this full voltage, thus their rating of V determines the maximum individual switch rating. The switches 128 and 132 must be able to handle ⅝ of the full voltage V and switch 130 must handle one half of V. Therefore, the total switch voltage rating for the four section arrangement shown in FIG. 3 is 4V.

It can be seen, by inspection of the table of FIG. 4, that the switching arrangements taught by this invention offer several advantages over the conventional arrangement of FIG. 3. The four section arrangements of FIGS. 1 and 2 provide switching increments equal to V/8, whereas the arrangement of FIG. 3 provides an increment of V/4. The maximum individual switch rating for FIGS. 1 and 2 is lower than that of FIG. 3. The total switch rating is only 2V for the arrangement of FIG. 1 and 3V for the arrangement of FIG. 2 compared to a value of 4V for the arrangement of FIG. 3. Increasing the sections would further improve the advantages of the arrangements of this invention. Although the table illustrates the advantages over an arrangement with the same voltage range, other advantages also exist. For example, the four section arrangement of FIG. 1 could provide twice the voltage range with equal stepping increments and ¼ the maximum individual switch rating as the arrangement of FIG. 3 with the same total switch rating.

FIG. 5 is a schematic circuit diagram of a complete tap changing apparatus constructed according to an embodiment of this invention. A source 136 of AC potential is connected to a primary winding 138. A magnetic core 140 couples the primary winding 138 to two secondary windings, 142 and 144. Silicon controlled rectifiers 144, 146, 148, 150, 152, 154, 156 and 158 are connected in inverse parallel combination to form the bridge 159 around the winding 144. The gate electrodes of the silicon controlled rectifiers or SCR's are connected to a gate drive circuit 160. A load 162 is connected between the bridge 159 and the winding 142. The gate drive circuit provides a gating signal capable of controlling the SCR's. The gating signal is sequenced to produce the switching pattern desired. Here, as well as in the other arrangements described in this invention, the gating signal must be synchronized so that a current path exists at all times between the windings and the load.

Although the invention has been described mainly with tap changing arrangements for AC voltage regulation, other uses of this invention are obvious. An HVDC rectification system could utilize the teachings of this invention for controlling the output voltage. Another useful application of this invention is provided by the tap changing requirements of phase angle regulators.

FIG. 6 is a schematic diagram showing the tap changing arrangement for one phase of a three-phase regulator for phase angle control. The magnetic core associated therewith is not illustrated. A winding 164, having a center tap 166, is connected between the source terminal 168 and the load terminal 170. Phase windings 172, 174 and 176 are delta connected with the terminal 178 connected to the center tap 166. The terminals 180 and 182 are for connection to the other two phases, which are omitted in the diagram for simplicity. The winding 184 is inductively coupled to the winding 164 and is connected to the terminals 186 and 188 of the tap changing arrangement 190. The tap changing arrangement 190 comprises four individual sections 192, 194, 196 and 198. Each section includes a winding, which is inductively coupled to the winding 176, and a bridge configuration of gate controlled switches. Interconnection between the four sections is accomplished by the conductors 200, 202 and 204. The tap changing arrangement 190 is similar to the basic arrangement disclosed in FIG. 1. The gate controlled switches of the sections 192, 194, 196 and 198 are driven by external gate driving means to provide a switching pattern which will produce the desired tap relationship between the terminals 186 and 188. Changing the tap pattern changes the phase angle for that particular phase. The load impedance of the tap windings can be maintained relatively constant by a switching pattern which adds sections in opposing relationship, rather than bypassing these sections. This characteristic can also be provided by the arrangement of FIG. 1.

In summary, there has been disclosed new and useful arrangements for tap changing apparatus using quick response switching elements. Better performance of the apparatus is obtainable with substantial economic savings.

I claim:

1. A switching circuit comprising first and second terminals, an electrical inductive winding having a first terminal at one end and a second terminal at the other end and at least one intermediate tap terminal, first, second, third and fourth switching means each having two terminals, said first switching means being connected between said first circuit terminal and said first winding terminal, said second switching means being connected between said first circuit terminal and said second winding terminal, said third switching means being connected between said second circuit terminal and said first winding terminal, and said fourth switching means being connected between said second circuit terminal and said second winding terminal, at least one intermediate switching means connected between said second circuit terminal and said intermediate tap on said winding, control means controlling the conduction of said first, second, third, fourth and intermediate switching means, said control means providing a controlling sequence which always maintains a conduction path between said circuit terminals when the circuit is conducting current, a first conduction path being through said first switching means and said third switching means, a second conduction path being through said first switching means, said winding and said fourth switching means, a third conduction path being through said second switching means and said fourth switching means, a fourth conduction path being through said second switching means, said winding and said third switching means, a fifth conduction path being through said first switching means, part of said winding and said intermediate switching means, and a sixth conduction path being through said second switching means, part of said winding and said intermediate switching means.

2. A three-phase phase angle regulator comprising a first winding having source, load and center tap terminals, second, third and fourth windings interconnected in three-phase relationship and connected to said center tap terminal, a fifth winding inductively coupled to said first winding and electrically connected to a multiple-winding switching circuit, said multiple-winding switching circuit comprising a plurality of tap windings inductively coupled to said fourth winding with each tap winding having first and second tap winding terminals, each of said tap windings being connected to a switching circuit, said switching circuit comprising first and second circuit terminals, first, second, third and fourth switching means each having two terminals, said first switching means being connected between said first circuit terminal and said first tap winding terminal, said second switching means being connected between said first circuit terminal and said second tap winding terminal, said third switching means being connected between said second circuit terminal and said first tap winding terminal, and said fourth switching means being connected between said second circuit terminal and said second tap winding terminal, control means controlling the conduction of said first, second, third and fourth switching means, said control means providing a controlling sequence which always maintains a conduction path between said circuit terminals when the circuit is conducting current, a first conduction path being through said first switching means and said third switching means, a second conduction path being through said first switching means, said winding and said fourth switching means, a third conduction path being through said second switching means and said fourth switching means, and a fourth conduction path being through said second switching means, said winding and said third switching means, the circuit terminals of the switching circuits of said tap windings being serially interconnected.

* * * * *